United States Patent [19]
Yasuda et al.

[11] Patent Number: 5,270,992
[45] Date of Patent: Dec. 14, 1993

[54] APPARATUS FOR CONTROLLING ROTATION OF DISK PLAYER

[75] Inventors: Shigeru Yasuda; Nobuhiro Suzuki; Hiroshi Otsubo, all of Tokorozawa, Japan

[73] Assignee: Pioneer Electronic Corporation, Tokyo, Japan

[21] Appl. No.: 854,294

[22] Filed: Mar. 19, 1992

[30] Foreign Application Priority Data

Mar. 27, 1991 [JP] Japan .................. 3-063583

[51] Int. Cl.$^5$ ............................................. G11B 3/90
[52] U.S. Cl. .................................. 369/53; 369/50; 360/73.03
[58] Field of Search ............ 369/50, 53, 54, 47, 369/48, 124, 189; 360/10.1, 73.03, 36.1, 36.2; 358/342, 337, 338

[56] References Cited

U.S. PATENT DOCUMENTS

| 4,727,530 | 2/1988 | Tomisawa | 369/50 |
| 4,785,442 | 11/1988 | Ohtake et al. | 369/44.32 X |
| 4,885,644 | 12/1989 | Ishii et al. | 369/50 X |

FOREIGN PATENT DOCUMENTS 59-40348  3/1984  Japan .................. 369/50

Primary Examiner—Aristotelis Psitos
Assistant Examiner—Duncan Wilkinson
Attorney, Agent, or Firm—Kane, Dalsimer, Sullivan, Kurucz, Levy, Eisele and Richard

[57] ABSTRACT

An apparatus for controlling rotation of a spindle motor includes a lock detection unit, a memory unit, a comparison unit, and a control unit. When the lock detection unit detects the lock state of the time base servo loop, a voltage corresponding to the frequency of a read RF signal is stored in the memory unit. When the control unit detects that the rotation velocity of the spindle motor greatly deviates from a normal rotation velocity, it effects a control so as to accelerate or decelerate the spindle motor in dependency upon a compared result of the comparison unit which makes a comparison between a voltage corresponding to the frequency of the read RF signal and a voltage stored in the memory unit.

5 Claims, 4 Drawing Sheets

APPARATUS FOR CONTROLLING ROTATION OF DISK PLAYER

BACKGROUND OF THE INVENTION

This invention relates to an apparatus for controlling rotation of a spindle motor in a disk player such as a video disk player, etc.

As a video disk on which information in a video format is recorded, there exist a CAV (Constant Angular Velocity) disk on which information is recorded at a constant angular velocity and a CLV (Constant Linear Velocity) disk on which information is recorded at a constant linear velocity.

In a CAV disk, it is required to fix the number of rotations of the motor to be a predetermined angular velocity (e.g., 1800 rpm). Further, in a CLV disk, it is required to change the rotation velocity of the disk in dependency upon the information reading position in a radial direction of the disk.

To realize this, in both the CAV disk and the CLV disk, a spindle servo loop for carrying out a control in which the rotation velocity is kept to be constant and a time base servo loop for carrying out a fine adjustment of a reproduced signal with respect to the time base are necessarily required.

By the action of these servo loops, the rotation velocity of the CLV disk can be controlled to be a constant linear velocity. When a CLV disk is reproduced, in the case where the servo loops are forcedly opened, or the servo loops undesirably deviate from followable range by disturbance from outside, so the rotation velocity of the spindle motor greatly deviates from a normal rotation velocity, it is necessary to quickly restore the rotation velocity of the spindle motor to be within the followable range of the spindle servo loop.

In a conventional apparatus, in the case where the servo loops undesirably deviate from an allowable followable range, returning operation to the lock state was conducted as follows.

Between the rotation velocity of the spindle motor and the level of a read RF signal at that rotation velocity (i.e., DC (Direct Current voltage) level of a reproduced video signal), there exists a fixed correlation. Namely, when the rotation velocity of the spindle motor is high, the DC level of the video signal is high, while when the rotation velocity of the spindle motor is low, the DC level of the video signal is low. In view of this, a procedure is first taken to detect the DC level of the video signal by using a window comparator, whereby when the DC level deviates from a predetermined followable range (e.g., the range expressed as $V_1 > V > V_2$) of the spindle servo loop, the spindle servo loop is opened.

Then, the spindle motor is accelerated or decelerated until the rotation velocity becomes within the followable range of the spindle servo loop. After the rotation velocity of the spindle motor becomes within the followable range of the spindle servo loop, the spindle servo loop is closed. Thus, the spindle motor is returned to a lock state by the followable action of the spindle servo loop.

The outline of such a prior art is described in the U.S. Pat. No. 5,051,976.

It is generally said that the range where the spindle servo loop can be pulled in is approximately ±15% with respect to a normal rotation velocity. Accordingly it is requried to set the voltages V1 and V2 serving as a reference voltage of the window comparator to voltages of approximately ±15% with respect to the DC level of a video signal obtained at the time of a normal rotation velocity.

However, setting the reference voltages V1 and V2 in every products results in an increase of the manufacturing cost, and two reference voltage setting volumes, etc. are required.

SUMMARY OF THE INVENTION

An object of this invention is to provide an apparatus for controlling rotation of a disk player, in which no setting/adjustment of two reference voltages is required.

According to one aspect of this invention, an apparatus for controlling rotation of a disk player of this invention comprises a spindle motor for rotating the disk at a predetermined linear velocity, a spindle servo loop for controlling the rotation of the spindle motor, a time base servo loop for correcting a demodulated signal with respect to the time base, lock detection means for detecting the lock state of the time base servo loop, memory means for storing a voltage corresponding to the frequency of a read RF signal when the time base servo loop is judged by the lock detection means to be in a lock state, comparison means for making a comparison between a voltage corresponding to the frequency of the read RF signal and the voltage stored in the memory means, and control means for effecting a control to make the spindle motor be in an acceleration/deceleration mode in dependency upon a compared result of the comparison means when the rotation velocity of the spindle motor deviates from a followable range of the spindle servo loop.

In accordance with the apparatus for controlling rotation of disk player thus constructed, when the lock detection means detects the lock state of the time base servo loop, a voltage corresponding to the frequency of the read RF signal is stored into the memory means. When the control means detects that the rotation velocity of the spindle motor deviates from the followable range of the spindle servo loop, the spindle motor is controlled to be accelerated or decelerated in dependency upon a compared result of the comparison means which makes a comparison between a voltage corresponding to the frequency of the read RF signal and a voltage stored in the memory means.

Thus, since a level corresponding to the frequency of an RF signal reproduced from the disk is used to detect an extraordinary rotation of the spindle motor, a comparator as in the prior art is not required, and adjustment of the threshold level of the comparator becomes unnecessary.

DESCRIPTION OF THE PREFERRED EMBODIMENT

[I] General Description

Prior to the description of a preferred embodiment, an example of a conventional typical apparatus for controlling rotation of a spindle motor will be first described for a better understanding of this invention.

Figure 1:
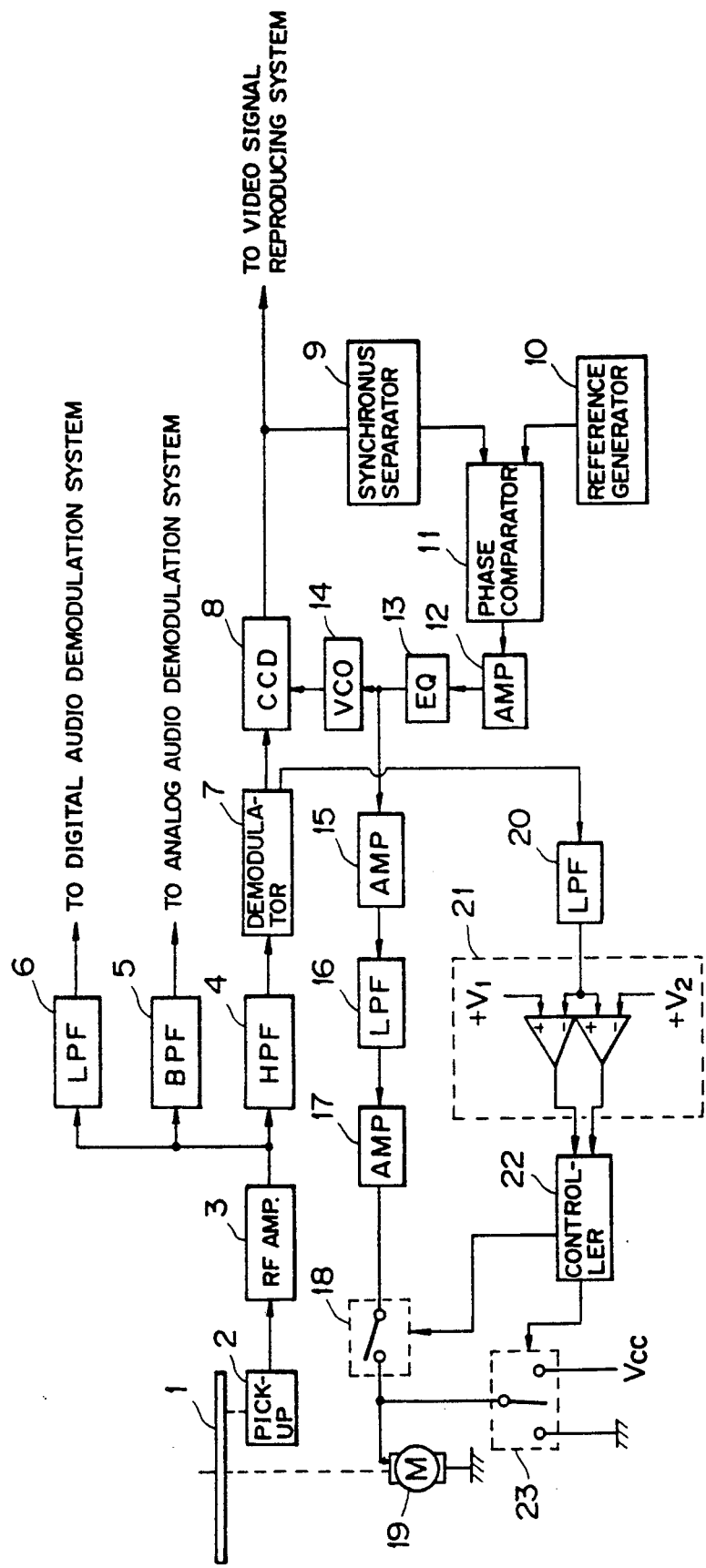
FIG. 1 is a block diagram showing a configuration of an example of a conventional disk player.

FIG. 1 is a block diagram showing an example of a conventional apparatus for controlling rotation of a spindle motor.

In FIG. 1, reference numeral 1 represents a disk rotated at a predetermined rotation velocity by a spindle motor 19. The rotation velocity of the spindle motor is varied in correspondance with the voltage supplied thereto.

Figure 2:
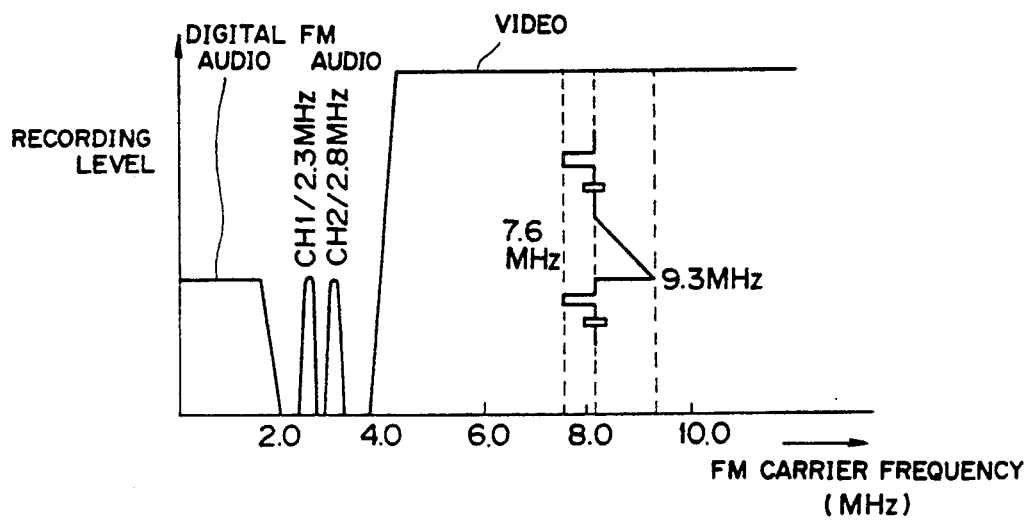
FIG. 2 is a view showing an example of the video disk format.

On the disk 1, a video signal, a FM modulated audio signal (FM audio signal), and a digitalized audio signal (digital audio signal) are subjected to frequency division multiplexing and are recorded in accordance with the format shown in FIG. 2. These signals are modulated as follows. The video signal is frequency-modulated so that the sync. chip (DC level of the horizontal synchronizing signal) and the white peak become equal to 7.6 MHz and 9.3 MHz, respectively; the FM audio signal is modulated so that carriers at 2.3 MHz and 2.8 MHz are frequency-modulated, respectively; and the digital audio signal is modulated in accordance with, e.g., the EFM (Eight to Fourteen Modulation) system.

Information recorded on the disk 1 is read by a pick-up 2. A read RF signal thus obtained is then subjected to such a processing that only the video frequency band component is extracted at a high pass filter (HPF) 4. The read RF signal thus processed is delivered to an FM demodulation circuit 7. Further, only the frequency band component of the FM audio signal is extracted by a band pass filter (BPF) 5, and is then delivered to an analog audio demodulation system (not shown). In addition, only the frequency band component of the digital audio signal is extracted by a low pass filter (LPF) 6, and is then delivered to a digital audio demodulation system (not shown).

The pick-up 2 is subjected to the positional control in a radial direction of the disk and the positional control in a direction vertical to the disk surface by the tracking servo, the slider servo and the focus servo (not shown). Since these servo controls are well known technologies, the explanation will be omitted.

The demodulation circuit 7 includes a limiter, a monostable multivibrator (D-MMV) for generating a pulse at the time delayed by a predetermined time from a predetermined edge of the limiter output, a multiplier for multiplying the limiter output by an output from the D-MMV, and a low pass filter for extracting the low frequency band component of the multiplier output (indication of the above components of the demodulation circuit 7 is omitted here). This demodulation circuit carries out the FM demodulation of the read RF signal on the basis of the principle equivalent to a so-called pulse count system thus to provide a composite video signal.

A video signal demodulated at the demodulation circuit 7 is delivered to a CCD (Charge Coupled Device) 8 as a variable delay element which carries out a fine adjustment of the time base by means of controlling the delay time thereof in accordance with a time base error signal (which will be described later). A video output signal is thus provided and is delivered to video signal reproducing system (not shown).

An output from the CCD 8 is also delivered to a synchronous separation circuit 9, at which a reproduced horizontal synchronizing signal is separated. The output signal thus processed is delivered to a phase comparator 11. A reference horizontal synchronizing signal generated by a reference signal generator 10 is delivered to the other input terminal of the phase comparator 11. Thus, the phase comparator 11 outputs, as a time base error signal, a phase difference between the reproduced horizontal synchronizing signal and the reference horizontal synchronizing signal. Since the time base error signal is delivered to a voltage controlled oscillator (VCO) 14 through an amplifier 12 and an equalizer 13 which determines the overall gain characteristic of the loop, the VCO 14 is controlled to generate a clock signal at the frequency corresponding to the time base error signal. In addition, the delay time of the CCD 8 is controlled by the clock signal from the VCO 14. Thus, fine adjustment of the time base is performed. By the above mentioned components, the time base servo loop is formed.

On the other hand, an output from the equalizer 13 is delivered to a LPF 16 through an amplifier 15. The low frequency component of the time base error signal is extracted at the LPF 16. The output thus obtained is amplified at an amplifier 17, and is then delivered to a spindle motor 19 through a loop switch 18. Namely, the rotation velocity of the spindle motor 19 is controlled in accordance with a low frequency component of the time base error signal.

By the above-mentioned components, the time base servo is formed. If the time base servo loop is in a lock state, the rotation velocity of the spindle motor 19 is controlled in dependency upon the low frequency component of the time base error signal.

Further, even in the case where the time base servo loop deviates from the lock state, if that deviation is within the followable range of the spindle servo loop, the spindle servo loop can be automatically returned to a lock state. On the other hand, in the case where the rotation velocity of the spindle motor 19 deviates from the followable range of the spindle servo loop, the following arrangement is employed in order to forcedly restore the rotation velocity of the spindle motor to be within the followable range of the spindle servo loop.

If the rotation velocity of the spindle motor 19 is lower than a normal rotation velocity, since the frequency of the read RF signal shifts to the lower frequency band side as a whole, the video frequency band shown in FIG. 2 shifts to the lower frequency band side. As a result, the demodulated video level lowers. On the other hand, in the case where the rotation vleocity of the spindle motor 19 is higher than the normal rotation velocity, the video level rises. As stated above, there exists the correlation between the rotation velocity of the spindle motor 19 and the video level, i.e., the level corresponding to the frequency of the read RF signal.

Figure 3:
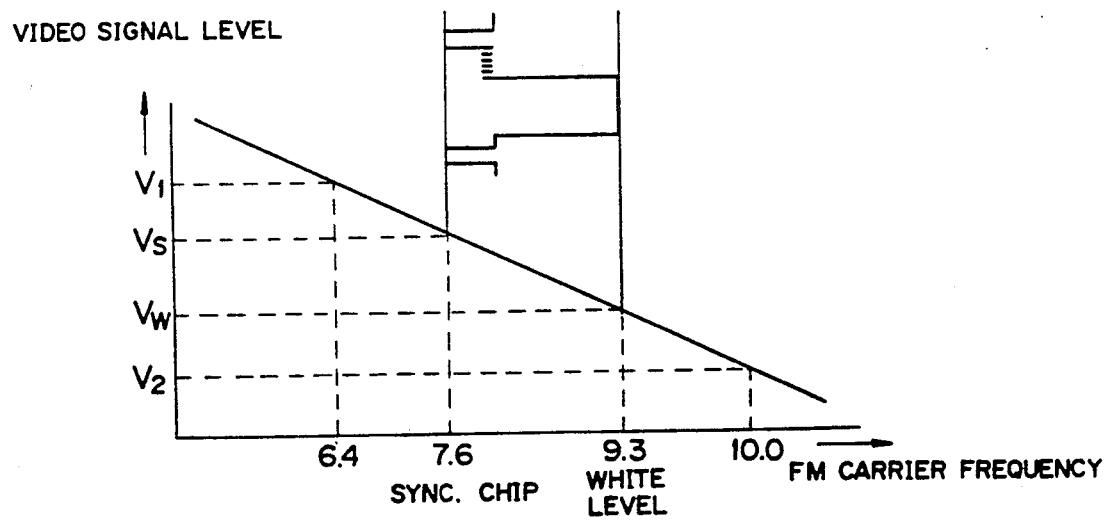
FIG. 3 is an explanatory view showing the correlation between the RF signal and the video signal level.

The video signal is provided by the multiplier output of the demodulator 7. Generally, the multiplier can easily provide not only a positive phase output but also an antiphase output. The relationship between the antiphase output of the multiplier and the FM carrier frequency varying in dependency upon the rotation velocity of the spindle motor 19 is as shown in FIG. 3.

Namely, when the spindle motor rotates at a normal rotation velocity, the white peak of the video signal has a level of Vw and the sync. chip thereof has a level of Vs.

Supposing that the rotation velocity of the spindle motor deviates from the followable range of the spindle servo loop when the DC level of the video signal deviates from the range of V2 to V1, an acceleration or deceleration instruction is given to the spindle motor 19 in such a case.

In the example of FIG. 1, an antiphase output of a video signal provided from the demodulator 7 is delivered to a LPF 20. Thus, a DC level of the video signal is provided. The DC level thus obtained is delivered to a window comparator 21. When the DC level of the video signal deviates from the range from V2 to V1, the window comparator 21 gives a control signal to a control circuit 22. When the control circuit 22 is supplied with a control signal from the window comparator 21, it makes the loop switch 18 be turned OFF, and causes a switch 23 to perform a switching control thus to accelerate or decelerate the spindle motor 19. Namely, the control circuit 22 controls the switch 23 so as to deliver the ground potential to decelerate the spindle motor 19 when the DC level of the video signal is lower than V2, and to deliver a constant voltage Vcc to accelerate the spindle motor 19 when that DC level is higher than V1.

When the rotation velocity of the spindle motor 19 restores to be in the followable range of the spindle servo loop, the control circuit 22 makes the loop switch 18 be turned ON, and makes the switch 23 be in a nutral state, thus to form a spindle servo loop.

In such an apparatus for controlling rotation velocity of the spindle motor, as previously described, setting reference voltages V1 and V2 in every products results in an increase of the manufacturing cost, and two reference voltage setting volumes, etc. are required.

[II] Preferred Embodiment of this Invention

A preferred embodiment of this invention will now be described with reference to the attached drawings. It is to be noted that the same reference numerals are respectively given to the same portions as those used in the description of the prior art, and their explanation will be omitted depending upon circumstances.

Figure 4:
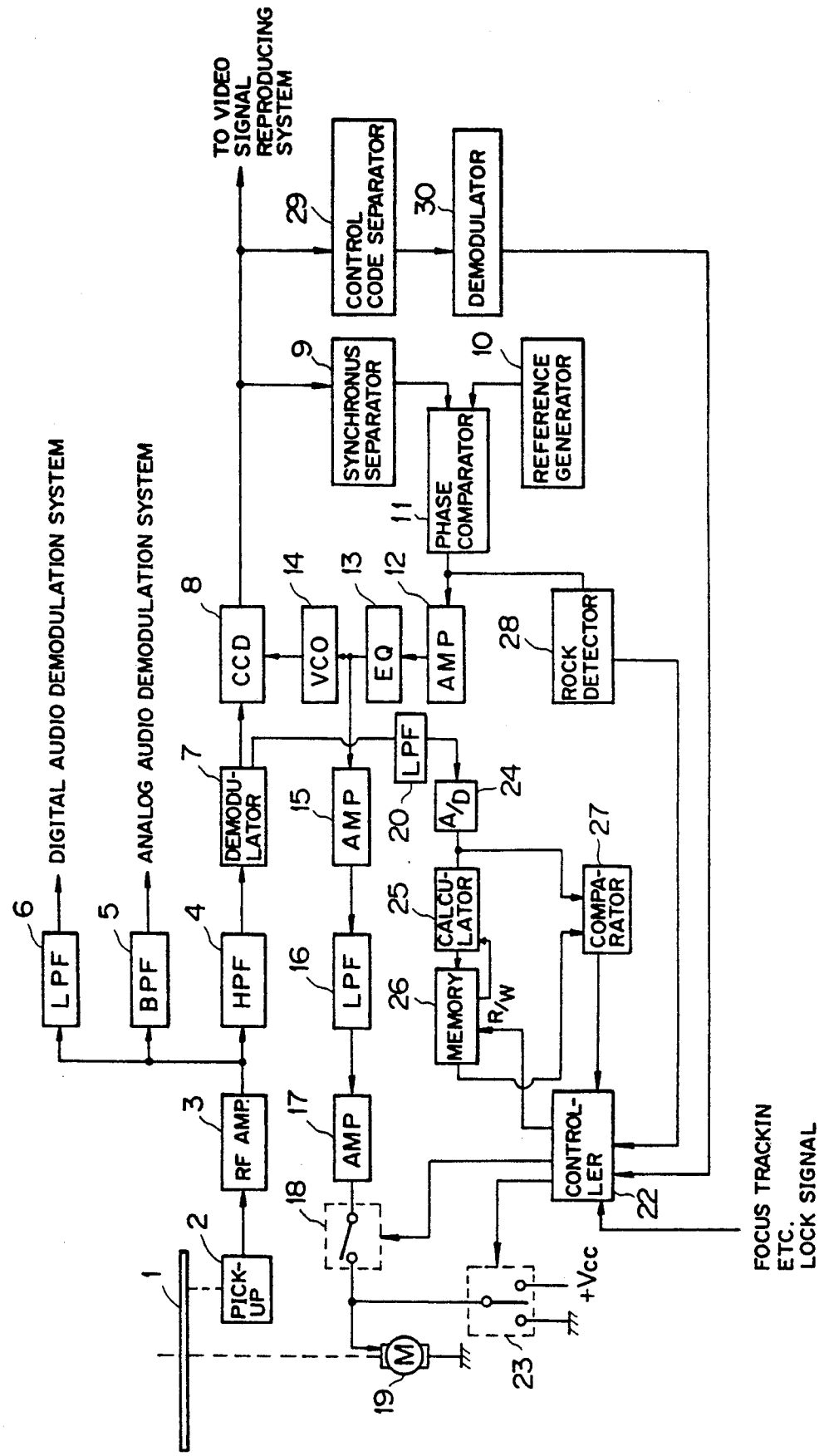
FIG. 4 is a block diagram showing a configuration of an embodiment of an apparatus for controlling rotation of the disk player according to this invention.

FIG. 4 is a block diagram showing the configuration of an embodiment of this invention. In FIG. 4, the time base error signal outputted from the phase comparator 11 is delivered to a lock detector 28 for detecting the lock state of the time base servo loop. The lock detector 28 produces an unlock signal, when a phase difference between the reproduced horizontal synchronizing signal and the reference horizontal synchronizing signal is above a predetermined level, for example.

The DC level of a video signal extracted at the LPF 20 is digitalized by an A/D converter 24, and is stored in a memory 26 through a calculation circuit 25.

The calculation circuit 25 serves to calculate the weighted mean of data stored in the memory 26 and data newly provided this time. In short, the calculation circuit 25 calculates a mean value of DC levels of the video signal momentarily obtained.

The memory 26 is subjected to the write/read control by the control circuit 22. Thus, DC level data of the video signal read out from the memory 26 is delivered to the comparator 27. An output from the A/D converter 24 is given to the other input terminal of the comparator 27.

The video signal includes a control code such as address information, etc. being multiplexed on a predetermined horizontal scanning line. The demodulated video signal is delivered to a control code separation circuit 29 for separating and extracting the control code. Thus, the separated control code is demodulated by a code demodulator 30.

To the control circuit 22 are inputted a control code demodulated by the code demodulator 30, a detected output from the lock detector 28, and signals indicative of the states of the focus servo, the tracking servo and the slider servo which are not shown. In dependency upon the states of these input signals, the control circuit 22 carries out the write/read control of the memory 26, the switching control of the loop switch 18, and the switching control of the switch 23. The switch 23 is such controlled by the control circuit 22 that any one of the neutral position, the predetermined power supply voltage +Vcc and the ground potential is selected. The power supply voltage +Vcc and the ground potential serve as drive signals for accelerating and decelerating the spindle motor 19, respectively.

In this embodiment, the control circuit 22 makes the memory store a mean value of the DC level of the video signal therein when the time base servo loop is in a lock state. Then, when the spindle servo loop deviates from the lock state, that is, the rotation velocity of the spindle motor 19 deviates from the followable range of the spindle servo loop, the control circuit 22 compulsorily accelerates or decelerates the spindle motor until the DC level of the read video signal corresponds to the DC level stored in the memory 26.

Figure 5:
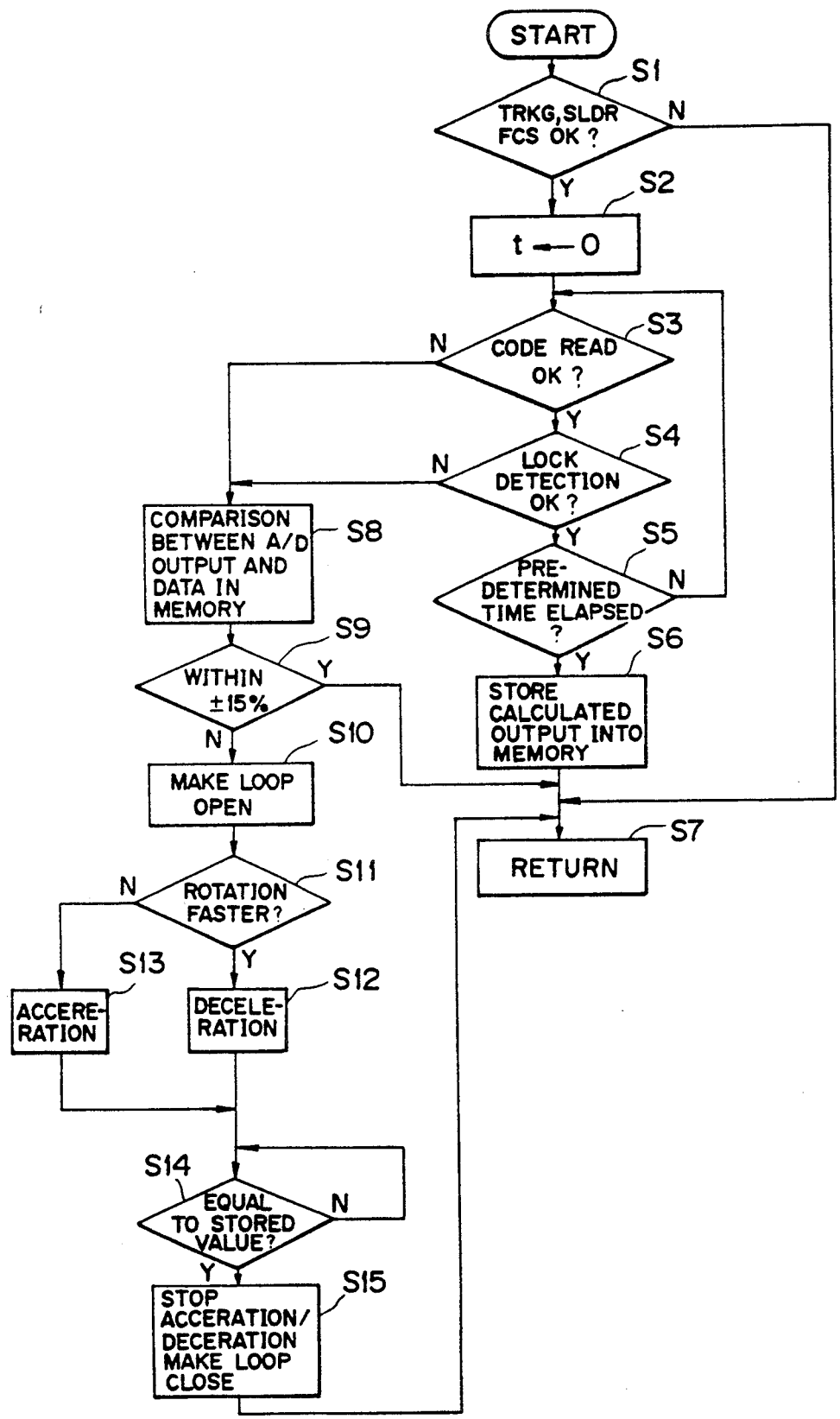
FIG. 5 is a flowchart showing an operation of the control circuit of FIG. 4.

The operation of the control circuit 22 will now be described in detail with reference to the flowchart of FIG. 5.

Initially, in step S1, the control circuit 22 discriminates whether or not the focus servo, the tracking servo and the slider servo are all in a lock state. The reason why such a discrimination is carried out is that when any one of the above-mentioned servo systems is in an unlock state, an expected operation in this embodiment cannot be performed. Accordingly, if any one of the respective servo systems is in an unlock state, the operation jumps to step S7.

If the above respective servo systems are all in a lock state, the timer provided in the control circuit 22 is reset at step S2. Then, at step S3, discrimination as to whether or not the control code is correctly read by the code demodulator 30 is carried out. As a result, if the control code is correctly read, discrimination as to whether or not the time base servo loop is in a lock state is carried out at step S4.

In step S5, discrimination as to whether or not the state where the discriminated results in steps S3 and S4 are both YES lasts for more than a predetermined time is carried out. As a result, if the predetermined time has elasped, the calculated result by the calculation circuit 25, i.e., the mean value of DC levels of the video signal is stored in the memory 26 in step S6. The step S5 is provided so as to store the DC level in the memory 26 when the time base servo loop is stably in a lock state.

On the other hand, in a case where either one of the discriminated results at steps S3 and S4 is NO, the operation proceeds to step S8 to make a comparison between the DC level of the video signal digitally converted at the A/D converter 24 and the DC level stored in the memory 26. In step S9, discrimination as to whether or not the difference therebetween is within ±15% with respect to the DC level stored in the memory 26. As a result, if the difference is within ±15%, the spindle servo loop is judged to be within the followable range thereof. The processing is thus completed.

However, in the case where it is discriminated in step S9 that the difference between the DC level of the video signal digitally converted at the A/D converter 24 and the DC level stored in the memory 26 is not within ±15%, it is judged that the spindle servo loop is not within the followable range thereof. Accordingly, in step S10, the loop switch 18 is opened thus to make the spindle servo loop be in an open state. Then, in step S11, whether the rotation of the spindle motor 19 is faster or slower than the normal rotation velocity is discriminated on the basis of the polarity of the compared result of the comparison circuit 27. As a result, in the case where that rotation velocity is judged to be faster, the switch 23 is turned to the ground potential side in step S12 thus to make the spindle motor be in a deceleration mode. In contrast, in the case where the rotation velocity is judged to be slower, the switch 23 is turned to the +Vcc side in step S13 thus to make the spindle motor be in an acceleration mode.

Under the state where the spindle motor is placed in the acceleration/deceleration mode, a compared output from the comparison circuit 27 is monitored in step S14. As a result, if the DC level of the video signal corresponds to the DC level stored in the memory 26, or reaches a level within a predetermined extent from the stored DC level, the switch 23 is placed at the neutral position in step S15 and the loop switch 18 is closed, thus to make the spindle servo loop be in a closed state. Then the spindle motor is returned to the lock state by the followable action of the spindle servo loop.

In the above described embodiment, the spindle motor is placed under the acceleration/deceleration mode when both results of discriminations whether or not the control code can be correctly read and whether or not the detection by the lock detector 28 is made, however, either one of the above discriminations may be employed.

Further, while the control code superimposed on a predetermined horizontal scanning line in a video signal is utilized as the control code, in the case of a disk including a digital sound in conformity with the compact disk format, subchannel data in the compact disk format may be utilized as the control code. In this case, an output from the subcode demodulation circuit in a digital audio demodulation system (not shown) may be used.

Generally, if the rotation frequency of the spindle motor deviates by approximately ±10% with respect to the normal rotation frequency, the subcode data is unable to be read. For this reason, it can be said that it is possible to more quickly detect an extraordinary rotation as compared with the case where the control code in a video signal in used. Accordingly, an approach may be employed to utilize the subcode data in the case where a digital sound signal is included and to use the control code in a video signal in the case where no digital sound signal is included, thus to detect an extraordinary rotation of the spindle motor.

In this case, it is necessary to provide means for discriminating whether or not a digital sound is included in a disk to be reproduced. Particularly, in the case of CD, or CDV, since a digital sound is necessarily recorded, it is sufficient to discriminate the size of a CD, a CDV and a video disk. In the case of the video disk, it is necessary to further detect whether or not a signal peculiar to the digital sound signal, e.g., a frame synchronizing signal is present.

Generally, the video level varies in dependency upon video information. For example, when white frames are successive, the frequency of the RF signal shifts to a higher frequency band side, while when black frames are successive, the frequency of the RF signal shifts to a lower frequency band side. Accordingly, since the video level also changes, an approach may be employed to sample and hold the level of a time period which is not dependent upon video information, e.g., the vertical blanking interval to store it in the memory 26. In this case, an arrangement may be employed in which a synchronous separation circuit for separating a vertical synchronizing signal from a video demodulated output is provided to make it generate a sampling pulse synchronous with the reproduced vertical synchronizing signal thus to store only the video level for a time period corresponding to the vertical blanking interval in the memory 26.

Further, while, in the above described embodiment, a demodulated output from the demodulation circuit 7 is used to provide a video level, a frequency to voltage converter (F-V converter) may be used because it is essentially sufficient to extract the level dependent upon the frequency of the RF signal.

Furthermore, when the spindle motor is in the acceleration/deceleration mode, not only the spindle servo loop but also the time base servo loop may be placed in an open state. In addition, while the timing at which these servo loops are closed is determined by discriminating whether or not the level corresponding to the frequency of the read RF signal (output from the A/D converter 24) corresponds to the level stored in the memory 26, or reaches a level in a predetermined extent from the stored DC level, it is sufficient to make the servo loops be in a closed state at any time after the rotation velocity of the spindle motor becomes within the followable range threreof.

The invention may be embodied in other specific forms without departing from the spirit or essetial characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for controlling rotation of a disk player for reading and reproducing a recording signal from a disk on which information is recorded at a predetermined linear velocity, comprising:
   a spindle motor for rotating the disk at the predetermined linear velocity;
   a spindle servo loop for controlling the rotation of said spindle motor;
   a time base servo loop for correcting a read signal with respect to a time base;
   lock detection means for detecting a lock state of said time base servo loop;
   memory means for storing a voltage corresponding to a frequency of the read signal when said lock detection means detects the lock state of said time base servo loop;
   comparison means for comparing a voltage corresponding to the read signal with the voltage stored in said memory means and generating an output signal indicative thereof; and control means for controlling said spindle motor in an acceleration/deceleration mode in accordance with the output of said comparison means when the rotation velocity of the spindle motor deviates from a lock range of said time base servo loop.

2. An apparatus for controlling rotation of a disk player as set forth in claim 1, wherein said voltage corresponding to the frequency of said read RF signal is a DC voltage of a demodulated video signal.

3. An apparatus for controlling rotation of a disk player as set forth in claim 1, wherein said memory means includes a memory, and calculation means for calculating a mean of data stored in said memory and data newly obtained.

4. An apparatus for controlling rotation of a disk player as set forth in claim 1, wherein said control means effects a such control that said control means drives said spindle motor until a difference between a rotation velocity of said spindle motor and a normal rotation velocity becomes within said followable range where said spindle loop can follow, and after said difference becomes within said followable range, said control means makes said spindle servo loop be in a closed state.

5. An apparatus for controlling rotation of a disk player as set forth in claim 1, further comprising control code detection means for detecting a control code in a video signal, wherein said control means makes said spindle motor be in an acceleration/deceleration mode in dependency upon a compared result of said comparison means, even in the case where said control code detection means judges that said control code cannot be correctly read.

* * * * *